E. W. BURGESS.
MANURE SPREADER.
APPLICATION FILED FEB. 8, 1916.
1,328,709.
Patented Jan. 20, 1920.
2 SHEETS—SHEET 1.
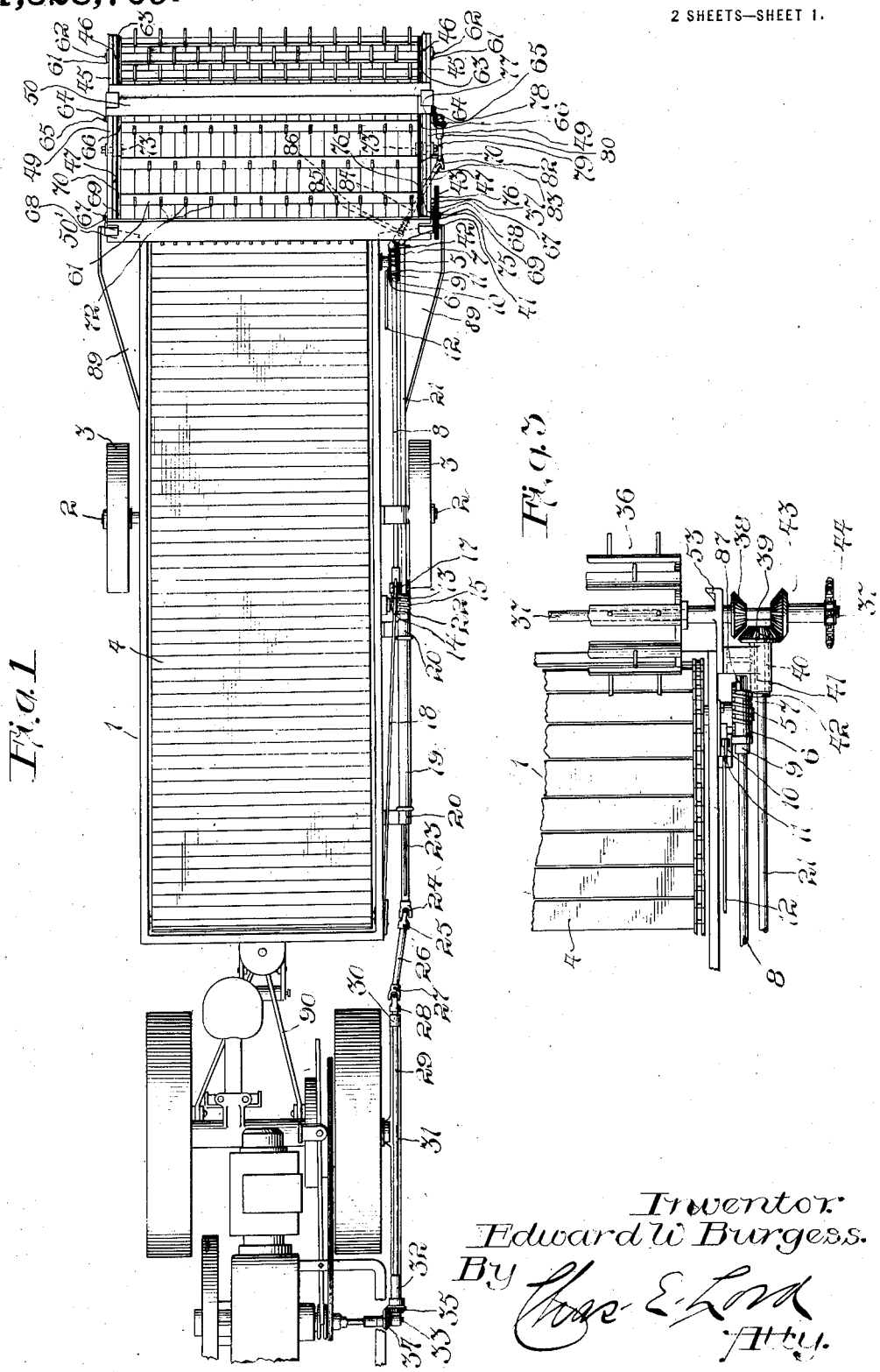
Inventor
Edward W Burgess.
By
Atty.

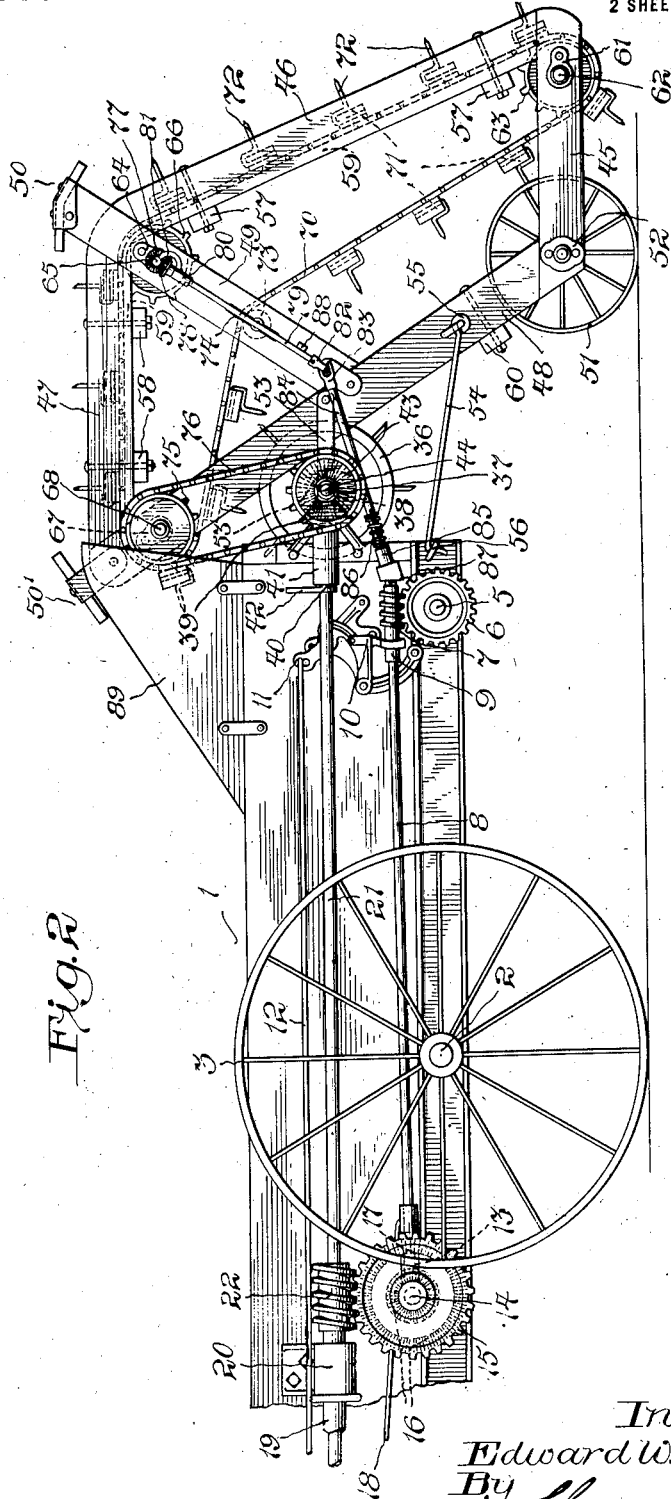

UNITED STATES PATENT OFFICE.

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

MANURE-SPREADER.

1,328,709.  Specification of Letters Patent.  Patented Jan. 20, 1920.

Application filed February 8, 1916. Serial No. 77,023.

*To all whom it may concern:*

Be it know that I, EDWARD W. BURGESS, a citizen of the United States, residing at Chicago, in the county of Cook and State of Illinois, have invented certain new and useful Improvements in Manure-Spreaders, of which the following is a full, clear, and exact specification.

My invention relates in general to manure spreaders adapted to be operated by a traction engine, and in particular to a manure loader adapted to be connected with the rear end of a spreader and operative to elevate and convey the manure from a yard or pile into the rear end of the receptacle of the spreader, and to have its operative parts driven from the power transmission gearing of the tractor. It includes an elevator frame mounted upon truck wheels and having an endless carrier operative thereon.

The object of the invention is to provide a simple, inexpensive and efficient machine for the purpose indicated. This object is attained by means of the mechanism illustrated in the accompanying drawings, in which—

Figure 1 is a top plan view of part of a tractor and a manure spreader operatively connected therewith, and connected with the spreader is my improved manure loader;

Fig. 2 is a side elevation of part of Fig. 1 on an enlarged scale; and

Fig. 3 is a detached plan view of part of the power transmission gearing of the spreader adapting it for connection with the operative parts of the loader attachment.

The same reference characters designate like parts throughout the several views.

The tractor and the tractor operated manure spreader are substantially like those shown and described in my application for patent filed October 22, 1915, Serial No. 57,302, tractor operated vehicle.

The manure spreader includes a receptacle 1 mounted upon an axle 2, having traction wheels 3 journaled upon its opposite ends, an endless apron 4 forming the bottom of the receptacle and driven from its rear end by means including a transversely disposed shaft 5 journaled in bearings carried by the spreader frame and having a worm wheel 6 secured to one end thereof, that is driven by means of a worm 7 secured to the rear end of a longitudinally disposed shaft 8 journaled in a bearing box 9 carried by an arm 10 forming part of a common form of shaft adjusting mechanism including an upwardly extending arm 11 having the rear end of a controlling rod 12 connected therewith, and the opposite end of the rod may be connected with a hand lever pivoted upon the front end of the spreader whereby the operator may control an engagement of the worm with the wheel. The front end of the shaft 8 is journaled in a bearing member 13 that turns about the axis of a stud 14 extending laterally from the side of the receptacle and having journaled thereon a worm wheel 15 provided with a series of concentric rows of gear teeth 16 spaced apart radially and adapted to selectively engage with a pinion 17 slidably mounted upon the front end of the shaft 8 and controlled by means of a gear shipping mechanism connected therewith and including a rod 18 that may be connected with a hand lever mounted upon the front end of the receptacle whereby the speed of the endless apron may be controlled, or the pinion may be held in a neutral position between the rows of teeth upon the worm wheel 15. 19 represents a longitudinally disposed sleeve having its opposite ends journaled in bearing brackets 20 secured to the side of the receptacle and having the front of a shaft 21 secured to its rear end, and 22 a worm secured to the shaft and engaging with the worm wheel 15. 23 represents a shaft having its rear end telescopically connected with the opposite end of the sleeve, as by means of a spline, and its front end provided with a universal coupling member 24 that is operatively connected with a corresponding coupling member 25 secured to the rear end of a short shaft 26 provided with a universal coupling member 27 that is operatively connected with a corresponding coupling member 28 secured to the rear end of a longitudinally disposed shaft 29, having its rear end journaled in a bearing member 30 carried by the rear end of a bar 31 that is supported at its middle on the end of the tractor axle, the front end of the shaft being journaled in a bearing member 32 secured to the front end of the bar and supported by the end of a countershaft 33 forming part of the power transmission gearing of the tractor and having a pinion 34 secured thereto that meshes with a corresponding pinion 35 secured to the front end of the shaft 29 whereby motion is transmitted from the power transmission gearing of the tractor to the operative parts of the spreader mechanism.

36 represents a distributing cylinder including an axial shaft 37 journaled in bearings carried by the rear end of the receptacle of the spreader and having a bevel pinion 38 secured thereto and adapted to mesh with a corresponding pinion 39 secured to the rear end of the shaft 21 that is journaled in an eccentric bearing sleeve 40 that is journaled in a bearing member 41 secured to the side of the spreader receptacle, and 42 represents a hand piece integral with the bearing sleeve whereby it may be rotated about its axis in a manner to carry the pinion 39 into or out of engagement with the pinion 38. 43 represents a combined pinion and sprocket wheel journaled upon the end of the shaft 37 and retained thereon by means of a pin 44, the shaft 21 being adjustable laterally by means of the eccentric bearing sleeve 40 in a manner to engage either of the pinions 38 or 43 or be adjusted to a neutral position between them.

The loader comprises a frame including base members 45 upon its opposite sides, having their rear ends secured to the lower ends of upwardly and forwardly inclined side frame members 46, having their upper ends secured to the rear ends of horizontally disposed side frame members 47 that extend forward in a plane above the distributing cylinder of the spreader, and 48 represents inclined frame members having their opposite ends secured to the front ends of the base members 45 and the horizontal member 47. 49 represents diagonally disposed frame members connecting the adjacent ends of the members 46 and 47 with the middle part of the members 48, 50 a transversely disposed deflector carried by the extended ends of the members 49, 50¹ an adjustable deflector carried by the front ends of the side frame members 47, 51 carrying wheels journaled upon stub axles carried by bracket members 52 secured to the front ends of the base frame members 45, 53 bumper members secured to the members 48 and adapted to contact with a fixed part of the spreader, and 54 hook members having their rear ends flexibly connected, by means of eye members 55, with the frame members 48 and their front ends adapted to be received by eye members 56 carried by the rear end of the spreader receptacle whereby the loader is detachably connected with the spreader. 57 represents cross bars having their opposite ends secured to the lower edges of the side frame members 46, 58 similar bars having their opposite ends secured to the horizontal frame members 47, and 59 elevator decks carried by the bars. 60 represents a cross bar having its opposite ends secured to the lower ends of the side frame members 48.

Secured to the rear ends of the base frame members 45 are bearing boxes 61, in which is journaled a transversely disposed shaft 62 having sprocket wheels 63 secured to its opposite ends. Similar bearing boxes 64 are secured to the diagonally disposed frame members 49, in which is journaled a transverse shaft 65, having sprocket wheels 66 secured to its opposite ends, and 67 like bearing boxes secured to the upper ends of the frame members 48 and having journaled therein a transverse shaft 68 provided with sprocket wheels 69 secured to its opposite ends, and 70 endless carrier chains upon opposite sides of the decks and engaging with the sprocket wheels 63, 66 and 69, the chains being connected by means of carrier cross bars 71 spaced apart along the length of the chains and each carrying a series of spaced teeth 72. The lower lead of the endless carrier is supported by means of idlers 73 journaled upon studs that are adjustably mounted in slotted openings 74 in the diagonally disposed frame members 49 whereby the tension of the endless carrier may be regulated.

The endless elevator carrier is driven by means of a sprocket wheel 75 secured to the end of the shaft 68 and connected with the sprocket wheel 43 by means of a sprocket chain 76. 77 represents a bevel pinion secured to the end of the transverse shaft 65 and meshing with a corresponding pinion 78 secured to the upper end of a diagonally disposed shaft 79 journaled in a bearing member 80 carried by an arm 81 adapted to turn about the axis of the shaft 65, and 82 represents a universal coupling member secured to the lower end of the shaft and operatively connected with a coöperating coupling member 83 secured to the rear end of a shaft 84 carrying at its front end a slidable universal coupling member 85 splined to the shaft and yieldingly held in engagement, by means of a compression spring 86 encircling the shaft, with a complemental coupling member 87 forming an extension of the worm 7 that imparts motion to the endless apron 4 of the spreader. The lower end of the shaft 79 is supported by means of an arm 88 extending laterally from the frame member 49.

The driving chain 76 may be disconnected from the sprocket wheel 43, or the pin 44 may be removed and the wheel removed from the shaft.

The loader has a width equal to that of the tread of the carrying wheels of the spreader, and in operation may be backed to a pile of manure. The downwardly and forwardly converging wing members 89 extending from the sides of the spreader receptacle direct the material into the relatively narrow receptacle.

In operation the spreader is moved backward by the tractor, with which it is connected by means of the draw bar 90 in contact with the bumper members 53, and the hook members 54 connected with the spreader, the sprocket wheel 43 is placed upon the shaft 37, the pinion 39 thrown into mesh with the pinion on the sprocket wheel 43, and the coupling member 85 placed in engagement with the coupling member 87. Motion may then be communicated from the power transmission gearing of the tractor's engine to the endless elevator carrier of the loader in a reverse direction from that given to the distributing cylinder when in operation, and from the carrier to the worm 7 in a reverse direction. The spreader and loader are then moved by the tractor toward the pile of manure or around the yard, and as the rear end of the receptacle is filled the worm 7 is caused to engage with the worm wheel 6 and thereby move the endless apron toward the front end of the receptacle.

Having shown and described one embodiment of my invention, I do not desire that it be limited to the precise details of the structure as illustrated, it being understood that many changes may be made in form, proportion and organization of its parts without departing from the spirit of the invention as indicated in the appended claims.

What I claim as my invention, and desire to secure by Letters Patent, is:

1. In combination, a source of power, a manure spreader having carrying wheels and an endless apron, operative connections between said source of power and said apron, including gearing normally adapted for driving said apron in a rearward direction, means for disconnecting said apron drive from said source of power, an endless belt manure loader attachment detachably carried by said spreader at the rear thereof, operative connections between said source of power and said loader for driving the outer run of said loader upwardly and forwardly, and operative connections between said loader and said apron drive gearing for driving said apron in a forward direction when said apron drive gearing is disconnected from its power source.

2. In combination, a source of power, a manure spreader having carrying wheels and an endless apron in the bottom thereof, operative connections between said source of power and said apron normally adapted for driving said apron in a rearward direction, means for disconnecting said apron drive from said source of power, an endless belt manure loader attachment detachably carried at the rear of said spreader, operative connections between said source of power and said loader, operative connections between said loader and said apron for driving said apron in a forward direction when said apron drive gearing is disconnected from its power source, and means for rendering inoperative said driving connections between said apron and said loader.

3. In combination, a manure spreader including a power driven shaft and a movable load carrying element, operative connections between said power driven shaft and said carrying element, normally adapted for driving the latter in a rearward direction, means for disconnecting said carrying element from said power driven shaft, a manure loader attachment including a frame having an upwardly and forwardly inclined part terminating in a substantially horizontally disposed forwardly extending part, an endless carrier, shafts having said carrier mounted thereon, one of said shafts being journaled on the lower end of the inclined part of said frame, a second shaft on the front end of said horizontally disposed part and a third shaft on the meeting ends of said frame parts, operative connections between said second shaft and said power driven shaft and between said third shaft and said movable carrying element for driving the latter in a forward direction when disconnected from its power source, said last-named connections including a portion of the first-named operative connections.

In testimony whereof I affix my signature.

EDWARD W. BURGESS.